United States Patent
Kranzen et al.

(10) Patent No.: US 7,570,020 B1
(45) Date of Patent: Aug. 4, 2009

(54) APPARATUS AND METHOD FOR MAGNETIC CHARGER IC FOR BATTERIES WITH RECYCLING OF THE LC FILTER FOR RE-USE AS A BATTERY STEP-DOWN CONVERTER

(75) Inventors: Bruno Kranzen, Palo Alto, CA (US); Luan Minh Vu, San Jose, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 140 days.

(21) Appl. No.: 11/241,537

(22) Filed: Sep. 30, 2005

(51) Int. Cl.
*H02J 7/00* (2006.01)
(52) U.S. Cl. .................. 320/128; 320/111; 320/137; 320/140; 323/282
(58) Field of Classification Search ............. 320/111, 320/114, 135, 137, 128, 140; 323/282
See application file for complete search history.

(56) References Cited

U.S. PATENT DOCUMENTS

| | | | | |
|---|---|---|---|---|
| 5,598,089 A | * | 1/1997 | Shintomi | 320/128 |
| 5,721,481 A | * | 2/1998 | Narita et al. | 320/111 |
| 6,157,168 A | * | 12/2000 | Malik | 320/128 |
| 2003/0220026 A1 | * | 11/2003 | Oki et al. | 439/894 |
| 2004/0145348 A1 | * | 7/2004 | Bucur et al. | 320/128 |
| 2005/0057238 A1 | * | 3/2005 | Yoshida | 323/282 |

OTHER PUBLICATIONS

Texas Instruments Datasheet (2004) "Synchronous Switchmode, Li-Ion and Li-Pol Charge Management IC with Integrated Powerfets (bqSWITCHER™)," pp. 1-5.

* cited by examiner

*Primary Examiner*—Akm E Ullah
*Assistant Examiner*—Arun Williams
(74) *Attorney, Agent, or Firm*—Darby & Darby P.C.; Matthew M. Gaffney

(57) ABSTRACT

A voltage regulation and battery charging system is provided. The system may include a switching regulator selection control circuit, two switching regulator controller circuits, two power transistors, a common synchronous transistor, a common LC circuit, and a battery charger circuit. The two switching regulator controller circuits may synchronously switch the two power transistors and the one common synchronous transistor. One of the switching regulator controller circuits may receive voltage from an AC adapter and the other may receive voltage from the battery. The first switching regulator controller circuit is employed to provide system power when the AC adapter is connected. When the battery is used to provide the system power, the second switching regulator controller circuit is used to down-convert the battery voltage to provide the system power.

20 Claims, 2 Drawing Sheets

US 7,570,020 B1

APPARATUS AND METHOD FOR MAGNETIC CHARGER IC FOR BATTERIES WITH RECYCLING OF THE LC FILTER FOR RE-USE AS A BATTERY STEP-DOWN CONVERTER

FIELD OF THE INVENTION

The invention is related to battery chargers, and in particular, to an apparatus and method for a battery charger and voltage regulator system in which the LC filter for providing the system voltage during the battery charging is also used to down-convert the battery voltage when battery is used to supply power.

BACKGROUND OF THE INVENTION

Generally, batteries are used to supply power to portable devices such as personal computers, radios, radiophones, stereo cassette tape players etc. Such batteries are typically available in two different types such as those characterized as rechargeable or non-rechargeable and exhibit different end-of-life voltage characteristics and effective series resistances. Non-rechargeable battery types are those ordinary alkaline batteries that should not be subjected to recharging attempts. Rechargeable battery types include nickel-cadmium (Ni—Cd), nickel-hydrogen (Ni—H), lithium-ion (Li-Ion), and nickel metal-hydride (Ni-MH). Also, a Constant Current-Constant Voltage (CC-CV) charging algorithm is common for most modern rechargeable batteries.

Typically, for a Li-Ion battery, battery charging is performed as follows. The supply voltage VDD is regulated to a fixed voltage (e.g. 4.2V) throughout the battery charging. If the battery voltage is below a minimum safe operating voltage (e.g. 3.0V), the charge current is regulated to a constant current corresponding to 0.1 C, which is referred to as "pre-charge mode". C represents battery capacity, typically measured in milliAmpere-hours (mA*hr). So, for a battery with a capacity of 1000 mA*hr, if the battery voltage is below the minimum safe operating voltage (e.g. 3.0V), then the charge current is regulated to 100 mA. Once the battery voltage reaches the minimum safe operating voltage, the charge current is regulated at a constant current corresponding to 1 C (e.g. 1 A, for a 1000 mA*hr battery). The battery charger remains in constant current (CC) mode, regulating the charge current to a constant current, until the battery voltage reaches the maximum safe operating voltage (e.g. 4.2V). At this point, the battery charger enters a constant voltage (CV) mode, where the battery voltage remains at 4.2V until the battery is fully charged.

BRIEF DESCRIPTION OF THE DRAWINGS

Non-limiting and non-exhaustive embodiments of the present invention are described with reference to the following drawings, in which.

DETAILED DESCRIPTION

Figure 1:
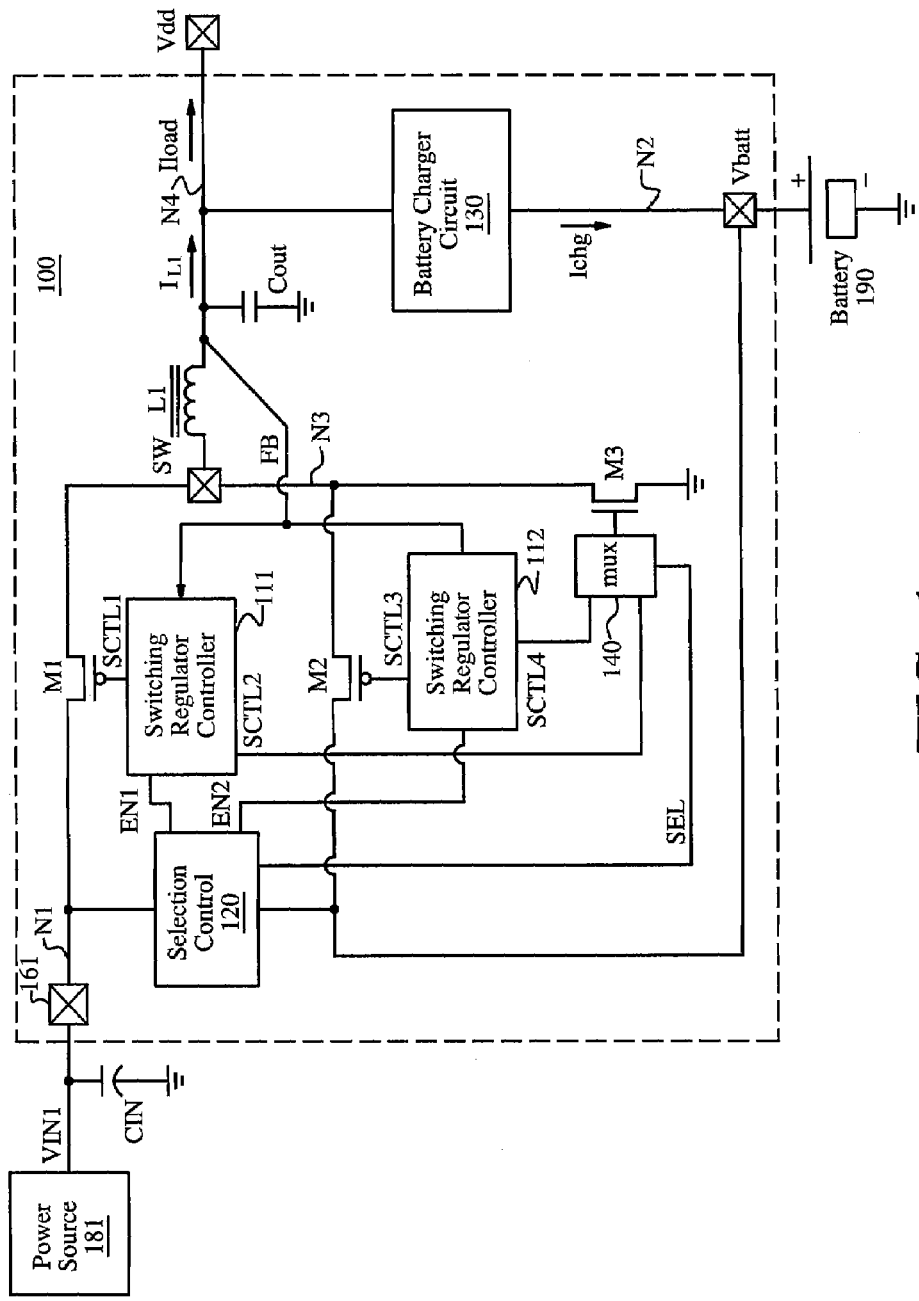
FIG. 1 illustrates a block diagram of an embodiment of a system for power regulation and battery charging.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" includes plural reference, and the meaning of "in" includes "in" and "on." The phrase "in one embodiment," as used herein does not necessarily refer to the same embodiment, although it may. The term "coupled" means at least either a direct electrical connection between the items connected, or an indirect connection through one or more passive or active intermediary devices. The term "circuit" means at least either a single component or a multiplicity of components, either active and/or passive, that are coupled together to provide a desired function. The term "signal" means at least one current, voltage, charge, temperature, data, or other signal. Where either a field effect transistor (FET) or a bipolar transistor may be employed as an embodiment of a transistor, the scope of the words "gate", "drain", and "source" includes "base", "collector", and "emitter", respectively, and vice versa.

Briefly stated, the invention is related to a voltage regulation and battery charging system that may include a switching regulator selection control circuit, two switching regulator controller circuits, two power transistors, a common synchronous transistor, a common LC circuit, and a battery charger circuit. The two switching regulator controller circuits may synchronously switch the two power transistors and the one common synchronous transistor. One of the switching regulator controller circuits may receive voltage from an AC adapter and the other may receive voltage from the battery. The first switching regulator controller circuit is employed to provide system power when the AC adapter is connected. When the battery is used to provide the system power, the second switching regulator controller circuit is used to down-convert the battery voltage to provide the system power.

FIG. 1 illustrates a block diagram of an embodiment of system 100 and external components. System 100 may include switching regulator controller circuit 111, switching regulator controller circuit 112, switching regulation selection control circuit 120, battery charger circuit 130, input port 161, multiplexer circuit 140, and transistors M1-M3. The external components may include battery 190, capacitor CIN, and power source 181.

In one embodiment, switching regulator controller circuit 111, switching regulator controller circuit 112, switching regulation selection control circuit 120, multiplexer circuit 140, and transistors M1-M3 are on-chip; battery charger circuit 130 is on a separate chip; and inductor L1, capacitor Cout, battery 190, and power source 181 are off-chip. In other embodiments, other arrangements may be employed. For example, in one embodiment, battery charger circuit 130 may be on the same chip as the switching regulator. As another example, in one embodiment, transistors M1-M3 are off-chip.

In operation, system 100 provides supply output voltage Vdd at node N4 to power an external load (not shown). Supply output voltage Vdd may be provided by converting an external power source (e.g. power source 181), or the external load may be powered by down-converting battery voltage Vbatt if an external power source is not connected. If a power source such as power source 181 is connected, system 100 is operable to charge battery 190. System 100 is connectable to battery 190 at battery node N2. In one embodiment, system 100 can simultaneously charge battery 190 and provide supply output voltage Vdd to the external load. In one embodiment, power source 181 is a wall adapter, a car adapter, or the like.

System 100 is operable to employ switching regulation to provide voltage Vdd from power source 181 or by down-converting battery voltage Vbatt. Regardless of whether power source 181 or battery voltage Vbatt is used to provide voltage Vdd, in an inductive-based embodiment, inductor L1 and capacitor Cout are used in the switching regulation. Accordingly, in an inductive-based embodiment, system 100 only requires one LC circuit to provide Vdd from an external power source or to provide Vdd by down-converting battery voltage Vbatt. Also, inductor L1 is operable to provide inductor current $I_{L1}$. Capacitor Cout is an output capacitor for the switching regulation.

Additionally, input port 161 at node N1 is connectable to power source 181, and a battery port at node N2 is connectable to battery 190. Switching regulator selection control circuit 120 is operable to detect the presence of voltage at nodes N1 and N2. In one embodiment, voltage is not deemed to be "present" at node N1 if the voltage is too small to charge battery 190. If voltage is present at node N1, selection control circuit 120 selects switching regulator controller 111 to control the switching regulation. If voltage is present at node N2 but not present at node N1, selection control circuit 120 selects switching regulator controller circuit 112 to control the switching regulation.

In this way, power source 181 is given priority over battery 190. If voltage is present at both node N1 and node N2, all power is sourced from power source 181, and battery 190 is charged if a charge cycle is presently occurring.

In one embodiment, transistors M1, M2, and M3 are coupled together at switch node N3 where signal SW is provided, and where signal SW is provided based on control of switching regulator controller circuit 111 or switching regulator controller circuit 112 depending on which was selected by switching regulation selection control circuit 120.

In one embodiment, if switching regulator selection control circuit 120 selects switching regulator controller circuit 111 for the switching regulation, signal EN1 is asserted and signal EN2 is unasserted. Also, in this embodiment, if switching regulator control circuit 120 selects switching regulator controller circuit 112 for the switching regulation, signal EN1 is unasserted and signal EN2 is asserted. Switching regulator controller circuit 111 is operable to be enabled if signal EN1 is asserted and disabled if signal EN1 is unasserted. Similarly, switching regulator controller circuit 112 is operable to be enabled if signal EN2 is asserted and disabled if signal EN2 is unasserted. Switching regulation selection control circuit 120 includes a logic state machine to control timing of the event where one switching regulator controller circuit cedes control to the other.

In other embodiments, the disabling function may be accomplished in a different manner than described above. For example, in one embodiment, an output of the switching regulator to be disabled or a signal path to the output may be disabled by opening a switch in the signal path. In this way, the switching regulator controller to be disabled (i.e. the one that was not selected for regulation) does not control the switching regulation.

Switching regulator controller circuit 111 is operable to, when enabled, provide switch control signal SCTL1 based, in part, on feedback signal FB. In a synchronously-rectified embodiment, switching regulator controller circuit 111 is further operable to provide switch control signal SCTL2. Embodiments of switching regulator controller circuit 111 may employ any switching regulation method known in the art, such as pulse width modulation (PWM), constant on-time (COT), hysteretic control, or the like.

Also, transistor M1 is a power transistor that operates as a switch circuit that opens and closes responsive to signal SCTL1.

Switching regulator controller circuit 112 and transistor M2 operate in a similar manner to switching regulator controller circuit 111 and transistor M1 as described above, except that transistor M1 is coupled to node N1, and transistor M2 is coupled to node N2.

In an asynchronously-rectified embodiment of system 100, multiplexer 140 and transistor M3 are not included in system 100, and signal SEL is not provided. However, in one synchronously-rectified embodiment of system 100, switching regulation selection control circuit 120 provides signal SEL for multiplexing signals SCTL2 and SCTL4, based on which of the switching regulator controller circuits is selected to control the switching regulation. Further, transistor M3 operates as a synchronous switch that opens and closes responsive to the output of multiplexer circuit 140.

Battery charger circuit 130 is operable to charge battery 190 by regulating charge current Ichg and/or battery voltage Vbatt. In one embodiment, battery 190 is a Lithium-Ion (Li-Ion) battery, and battery charger circuit 130 is operable to perform a CC-CV charging algorithm.

Although one arrangement of system 100 is illustrated in FIG. 1 and described above, other embodiments of system 100 may be employed. For example, although FIG. 1 illustrates an inductive-based switching regulation for the regulation of voltage VDD, in other embodiment, switched-capacitor based regulation may be employed. In this case, the switching regulator controller circuits share a single set of capacitors, rather than sharing an LC circuit.

Also, although only one external power source (i.e. power source 181) is illustrated in FIG. 1, in other embodiments, system 100 may be connectable to two or more external power sources, each of which have priority over battery 190.

Also, although system 100 is shown with two switching regulator controllers having separate high-side switches and sharing a synchronous switch (e.g. transistor M3) and an LC circuit, in another embodiment, the two switching regulator controllers each have a separate high-side switch and a separate synchronous switch and share an LC circuit. Additionally, as previously discussed, although a synchronously-rectified embodiment is shown in FIG. 1, asynchronously-rectified embodiments may also be employed. These embodiments and others are within and scope and spirit of the invention.

Figure 2:
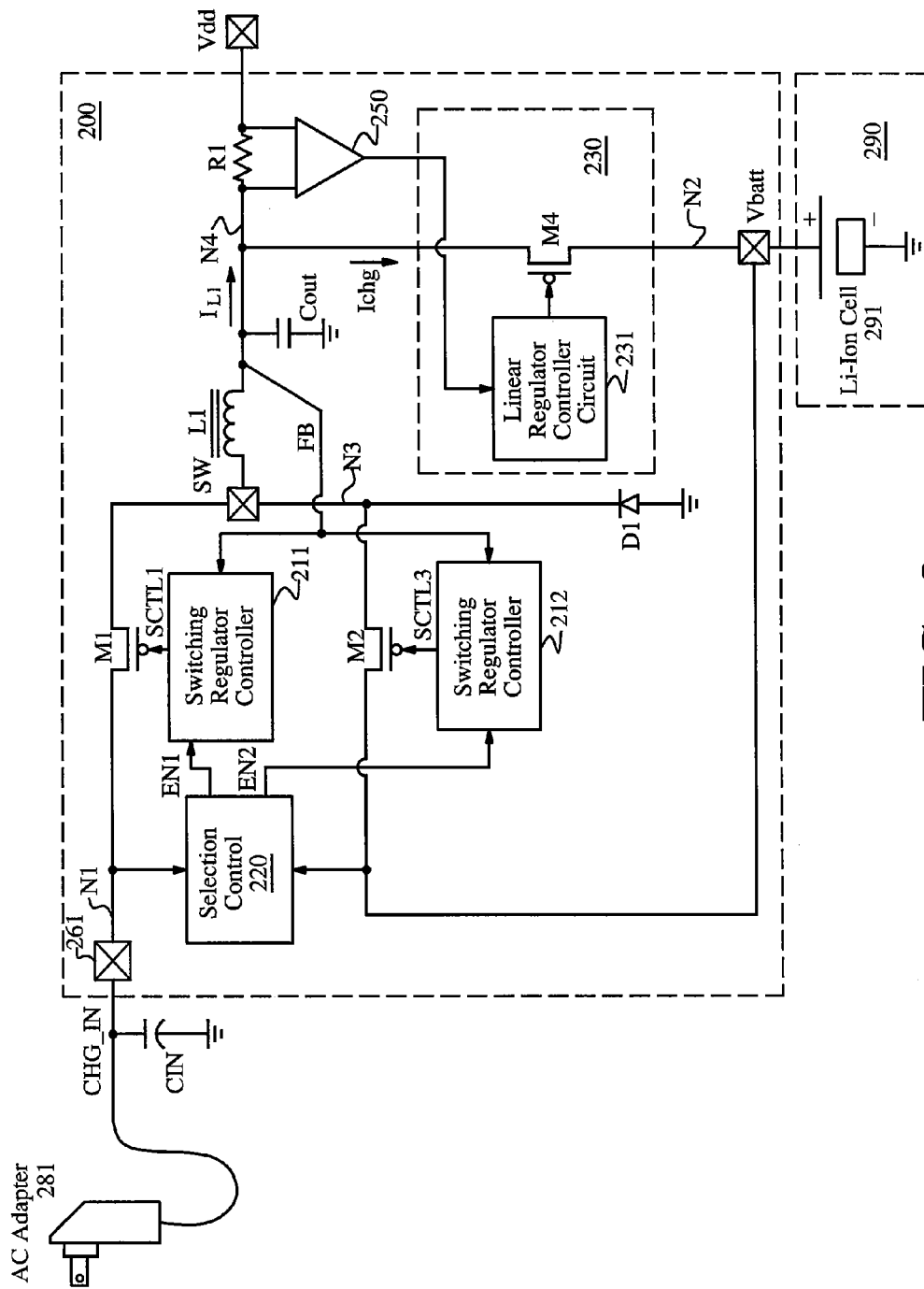
FIG. 2 shows a block diagram of an embodiment of the system of FIG. 1, arranged in accordance with aspects of the present invention.

FIG. 2 shows a block diagram of an embodiment of power regulation and battery charging system 200 and embodiments of external components. System 200 may be employed as an embodiment of system 100 of FIG. 1. System 200 shows an asynchronously-rectified embodiment; as previously discussed, both synchronously-rectified and asynchronously-rectified embodiments are within the scope and spirit of the invention. System 200 may further include resistor R1 and amplifier 250. An embodiment of battery charger circuit 230 includes linear regulator controller circuit 231 and transistor M4. An embodiment of battery 290 includes Li-Ion cell 291. In one embodiment, battery 290 is a single-cell Li-Ion battery. AC adapter 281 is an embodiment of power source 181 of FIG. 1, and signal CHG_IN is an embodiment of voltage VIN1 of FIG. 1. In one embodiment, a car adapter, or the like, may be used in place of AC adapter 281.

In one embodiment, amplifier 250 and resistor R1 are arranged for current sensing to support load sharing between the system and battery 290. Transistor M4 operates as a pass transistor. Transistor M4 and linear regulator controller circuit 231 operate together as a linear regulator.

Transistors M1, M2, and M4 each include a tub switch to couple the bulk to the either the drain or the source, whichever has the higher voltage.

Inductor L1 and Capacitor Cout operate together as a single common LC filter for switching regulator controller circuit 211 and switching regulator controller circuit 212. Inductor L1 includes exactly one inductor, or two or more inductors arranged in series and/or in parallel to operate as one inductor. Capacitor Cout includes exactly one capacitor, or two or more capacitors arranged in series and/or in parallel to operate as one capacitor.

In one embodiment, system 100 may be used to power a load which is usable at a voltage of about 3.0V or higher. In one embodiment, the load may include LDOs that are optimized for about 3.0V, and does not function at a voltage below about 3.0V. In one embodiment, when battery 190 is attached and no external power source is attached, switching regulator controller 112 controls down-conversion of battery voltage Vbatt to about 3.0V at node N4. By magnetically down-converting battery voltage Vbatt to about 3.0V before providing the voltage to the external load, increased efficiency is achieved. Accordingly, increased operating time of the external load powered by battery 190 may be achieved. The phrase "about 3.0V" is used because, in different embodiments, battery voltage Vbatt may be down-converted to a voltage that is about 3.0V but the exact voltage may vary from embodiment to embodiment. In one embodiment, battery voltage Vbatt is down-converted to 2.8V, which is included in the scope of "about 3.0V".

The above specification, examples and data provide a description of the manufacture and use of the composition of the invention. Since many embodiments of the invention can be made without departing from the spirit and scope of the invention, the invention also resides in the claims hereinafter appended.

What is claimed is:

1. A circuit for battery charging and buck conversion, comprising:
   a first switch circuit that is coupled between a power source input node and a switch node, wherein the first switch circuit has at least a control input, and wherein a power source is connectable to the power source input node;
   a first switching regulator controller circuit having at least a feedback input and an output, wherein the output of the first switching regulator controller circuit is coupled to the control input of the first switch circuit;
   a second switch circuit that is coupled between a battery node and the switch node, wherein the second switch circuit has at least a control input, and wherein a battery is connectable to the battery node;
   a second switching regulator controller circuit having at least a feedback input and an output, wherein the output of the second switching regulator controller circuit is coupled to the control input of the second switch circuit, and wherein the second switching regulator controller circuit is a buck controller circuit; and
   a switching regulator selection control circuit having at least a first input and a second input, wherein the first input of the switching regulator selection control circuit is coupled to the power source input node; the second input of the switching regulator selection control circuit is coupled to the battery node; and wherein the switching regulator selection control circuit is operable to control a disabling that is associated with the second switching regulator controller circuit if voltage is present at the first input of the switching regulator selection control circuit, and further operable to control a disabling that is associated with the first switching regulator controller circuit if voltage is present at the second input of the switching regulator selection control circuit and voltage is not present at the first input of the switching regulator selection control circuit.

2. The circuit of claim 1, wherein, if the battery is attached to the circuit and the power source is not attached to the circuit, the battery voltage is down-converted to about three volts to supply power to a VDD pin to supply power to a system.

3. The circuit of claim 1, further comprising:
   a synchronous switch circuit that is coupled between the switch node and ground, wherein the synchronous switch circuit has a control input, the first switching regulator controller circuit further has at least a second output, the second switching regulator controller circuit further has at least a second output, and wherein the switching regulator selection control circuit has at least a select output; and
   a multiplexer circuit having at least: a first input that is coupled to the second output of the first switching regulator controller circuit, a second input that is coupled to the second output of the second switching regulator controller circuit, a select input that is coupled to the select output of the switching regulator selection control circuit, and an output that is coupled to the control input of the synchronous switch circuit.

4. The circuit of claim 1, further comprising:
   a first synchronous switch circuit that is coupled between the switch node and ground, wherein the first synchronous switch circuit has a control input, the first switching regulator controller circuit further has at least a second output, the second switching regulator controller circuit further has at least a second output, and wherein the second output of the first switching regulator controller circuit is coupled to the control input of the first synchronous switch circuit; and
   a second synchronous switch circuit that is coupled between the switch node and ground, wherein the second synchronous switch circuit has a control input, and wherein the second output of the second switching regulator controller circuit is coupled to the control input of the second synchronous switch circuit.

5. The circuit of claim 1, further comprising a diode that is coupled to the switch node.

6. The circuit of claim 1, further comprising a battery charger circuit, wherein the switching regulator selection control circuit controls selection between the first switching regulator controller circuit or the second regulator controller circuit to control regulation of an output voltage that is provided at a supply output node, the battery charger circuit is coupled between the supply output node and the battery node, and wherein the battery charger circuit is operable to charge the battery by regulating at least one of a voltage of the battery or a charge current.

7. The circuit of claim 1, wherein the power source is a wall adapter or a car adapter.

8. The circuit of claim 1, wherein the first switching regulator controller circuit and the second switching regulator controller circuit share a single common LC filter for the regulation, at most one of the first and second switching controller circuits is enabled at a time based on the disabling control provided by the switching regulator selection control circuit, the feedback input of the first switching regulator controller circuit is coupled to the common LC filter, and wherein the feedback input of the second switching regulator controller circuit is coupled to the feedback input of the first switching regulator controller circuit.

9. The circuit of claim 8,
wherein the common LC filter has either: exactly one inductor; or a plurality of inductors arranged in series and/or in parallel to operate as exactly one inductor; and
wherein the common LC filter has either: exactly one capacitor; or a plurality of capacitors arranged in series and/or in parallel to operate as exactly one capacitor.

10. A circuit for battery charging and buck conversion, comprising:
a switching regulator that is operable to provide a supply output voltage at a supply output node, wherein the switching regulator includes:
an input port that is operable to receive power from an adapter if an adapter is connected to the input port;
a battery port that is operable to receive power from a battery if a battery is connected to the battery port;
a first switch circuit that is coupled between the input port and a switch node, wherein the first switch circuit has at least a control input;
a second switch circuit that is coupled between the battery port and the switch node, wherein the second switch circuit has at least a control input;
a switching regulator selection control circuit having at least a first input, a second input, a first enable output, and a second enable output, wherein the first input of the switching regulator selection control circuit is coupled to the input port; the second input of the switching regulator selection control circuit is coupled to the battery port; and wherein the switching regulator selection control circuit is operable to provide a first enable signal at the first enable output of the switching regulator section control circuit such that the first enable signal is asserted if voltage is present at the input port and unasserted otherwise, and further operable to provide a second enable signal at the second enable output of the switching regulator selection control circuit such that the second enable signal is asserted if: voltage is present at the battery port and voltage is not present at the input port;
a first switching regulator controller circuit having at least an enable input, a feedback input, and an output, wherein the output of the first switching regulator controller circuit is coupled to the control input of the first switch circuit; the enable input of the first switching regulator controller circuit is coupled to the first enable output of the switching regulator selection control circuit; and wherein the first switching regulator controller circuit is operable such that the first switching regulator controller circuit is enabled if the first enable signal is asserted, and disabled otherwise; and
a second switching regulator controller circuit having at least an enable input, a feedback input, and an output, wherein the output of the second switching regulator controller circuit is coupled to the control input of the second switch circuit; the enable input of the second switching regulator controller circuit is coupled to the second enable output of the switching regulator selection control circuit; the feedback input of the second switching regulator controller circuit is coupled to the feedback input of the first switching regulator controller circuit; and wherein the second switching regulator controller circuit is operable such that the second switching regulator controller circuit is enabled if the second enable signal is asserted, and disabled otherwise; and
a battery charger circuit that is coupled between the supply output node and the battery port, wherein the battery charger circuit is operable to charge the battery by regulating at least one of a charge current or a voltage of the battery.

11. The circuit of claim 10, wherein the first switching regulator controller circuit and the second switching regulator controller circuit share a single common LC filter for the regulation, at most one of the first and second switching controller circuits is enabled at a time based on the disabling control provided by the switching regulator selection control circuit, and wherein the feedback input of the first switching regulator controller circuit is coupled to the common LC filter.

12. The circuit of claim 10, wherein the switching regulator further includes:
a synchronous switch circuit that is coupled between the switch node and ground, wherein the synchronous switch circuit has a control input, the first switching regulator controller circuit further has at least a second output, the second switching regulator controller circuit further has at least a second output, and wherein the switching regulator selection control circuit has at least a select output; and
a multiplexer circuit having at least: a first input that is coupled to the second output of the first switching regulator controller circuit, a second input that is coupled to the second output of the second switching regulator controller circuit, a select input that is coupled to the select output of the switching regulator selection control circuit, and an output that is coupled to control input of the synchronous switch circuit.

13. The circuit of claim 10, wherein the switching regulator further includes a diode that is coupled to the switch node.

14. A method for regulation, comprising:
determining whether an adapter is present at a first node;
determining whether a battery is present at a second node;
if the adapter is present, performing switching regulation to convert an adapter voltage provided by the adapter into a supply output voltage, wherein an output stage is employed to perform the switching regulation;
if the battery is present and no external power sources are present, performing switching regulation to convert a battery voltage provided by the battery into the supply output voltage, wherein the output stage is employed to perform the switching regulation such that the output stage is a common output stage shared by the switching regulation to convert the adapter voltage into the supply output voltage and the switching regulation to convert the battery voltage into the supply output voltage; and
if the adapter is present, enabling a first switching regulation controller circuit and disabling a second switching regulation controller circuit.

15. The method of claim 14, wherein the output stage consists of a single LC circuit, and wherein the switching regulation is inductive-based buck regulation.

16. The method of claim 14, wherein the output stage includes a set of capacitors shared by the switching regulation to convert the adapter voltage and the switching regulation to convert the battery voltage, and wherein the switching regulation is switched-capacitor based regulation.

17. The method of claim 14, wherein the switching regulation to convert the adapter voltage and the switching regulation to convert the battery voltage share a synchronous switch.

18. The method of claim 14, wherein the switching regulation to convert the adapter voltage and the switching regulation to convert the battery voltage share a diode.

19. The method of claim 14, further comprising:
if the battery is present and no external power sources present, disabling the first switching regulation controller circuit and enabling the second switching regulation controller circuit, wherein performing the switching regulation to convert the adapter voltage into the supply output voltage includes employing the first switching regulator controller circuit, and wherein performing the switching regulation to convert the battery voltage into the supply output voltage includes employing the second switching regulator controller circuit.

20. The method of claim 14,
wherein performing the switching regulation to convert the adapter voltage into the supply output voltage includes opening and closing a first switch circuit based, in part, on a feedback signal, wherein the first switch circuit is coupled between the first node and the output stage; and
wherein performing the switching regulation to convert the battery voltage into the supply output voltage includes opening and closing a second switch-circuit based, in part, a feedback signal, wherein the second switch circuit is coupled between the second node and the output stage.

* * * * *

UNITED STATES PATENT AND TRADEMARK OFFICE
CERTIFICATE OF CORRECTION

PATENT NO. : 7,570,020 B1 Page 1 of 1
APPLICATION NO. : 11/241537
DATED : August 4, 2009
INVENTOR(S) : Bruno Kranzen et al.

It is certified that error appears in the above-identified patent and that said Letters Patent is hereby corrected as shown below:

In column 1, line 30, delete "modem" and insert -- modern --, therefor.

In column 10, line 12, in claim 20, delete "switch-circuit" and insert -- switch circuit --, therefor.

Signed and Sealed this

Twenty-ninth Day of December, 2009

David J. Kappos
*Director of the United States Patent and Trademark Office*